(12) United States Patent
Heilpern et al.

(10) Patent No.: US 10,757,205 B2
(45) Date of Patent: Aug. 25, 2020

(54) DERIVING MOBILE APPLICATION USAGE FROM NETWORK TRAFFIC

(71) Applicant: Performance and Privacy Ireland Ltd., Dublin (IE)

(72) Inventors: Jaime Heilpern, Dublin (IE); Naveen Puvvula, Dublin (IE); Jack Furr, Dublin (IE)

(73) Assignee: Performance and Privacy Ireland Ltd., Dublin (IE)

( * ) Notice: Subject to any disclaimer, the term of this patent is extended or adjusted under 35 U.S.C. 154(b) by 18 days.

(21) Appl. No.: 15/678,945

(22) Filed: Aug. 16, 2017

(65) Prior Publication Data

US 2018/0054493 A1 Feb. 22, 2018

Related U.S. Application Data

(60) Provisional application No. 62/376,286, filed on Aug. 17, 2016.

(51) Int. Cl.
*H04L 29/08* (2006.01)
*H04L 12/26* (2006.01)
*H04L 29/06* (2006.01)

(52) U.S. Cl.
CPC ............. *H04L 67/22* (2013.01); *H04L 43/04* (2013.01); *H04L 67/04* (2013.01); *H04L 69/22* (2013.01); *H04L 43/0876* (2013.01); *H04L 67/02* (2013.01)

(58) Field of Classification Search
CPC ......... H04L 67/22; H04L 43/04; H04L 67/04; H04L 69/22; H04L 43/0876; H04L 67/02
See application file for complete search history.

(56) References Cited

U.S. PATENT DOCUMENTS

| 8,386,509 B1 | 2/2013 | Scofield et al. |
| 8,484,568 B2 * | 7/2013 | Rados ................. H04L 41/5032 715/745 |
| 9,152,694 B1 * | 10/2015 | Padidar ................... G06F 21/51 |

(Continued)

OTHER PUBLICATIONS

PCT International Search Report and Written Opinion, PCT Application No. PCT/US2017/047195, dated Oct. 31, 2017, 19 pages.

*Primary Examiner* — Kamal B Divecha
*Assistant Examiner* — Sujana Khakural
(74) *Attorney, Agent, or Firm* — Fenwick & West LLP

(57) ABSTRACT

A system provides monitoring for application usage on a device, such as a mobile device, using network consumption data of the device. The system determines an application list of applications executing on a device, determines application strings associated with the applications, receives network consumption data for a process executing on the device, and determines consumption data strings from the network consumption data. The system further determines match scores by identifying matching strings between the application strings and the consumption data strings along weighted search paths defined between the application strings and the consumption data strings, identifies an application from the application list for the process based on the match scores, and associates the network consumption data for the process with the application. The system generates usage data for the application by aggregating network consumption data associated with the application over time.

13 Claims, 12 Drawing Sheets

(56) References Cited

U.S. PATENT DOCUMENTS

| | | | |
|---|---|---|---|
| 9,154,550 B1* | 10/2015 | Abgrall | H04L 67/1002 |
| 10,616,127 B1* | 4/2020 | Suit | H04L 47/70 |
| 2003/0229695 A1 | 12/2003 | McBride | |
| 2009/0287695 A1* | 11/2009 | Egan | G06F 16/334 |
| 2010/0088670 A1* | 4/2010 | Paster | H04L 43/022 |
| | | | 717/106 |
| 2012/0069748 A1* | 3/2012 | Van Den Bogaert | |
| | | | H04W 24/10 |
| | | | 370/252 |
| 2012/0317306 A1* | 12/2012 | Radinsky | H04L 43/028 |
| | | | 709/235 |
| 2013/0054378 A1* | 2/2013 | Hao | G06Q 30/04 |
| | | | 705/14.66 |
| 2013/0205366 A1 | 8/2013 | Luna et al. | |
| 2014/0279768 A1* | 9/2014 | Rash | G06N 5/02 |
| | | | 706/14 |
| 2015/0133094 A1 | 5/2015 | Lindeman et al. | |
| 2015/0163694 A1 | 6/2015 | Raleigh | |
| 2016/0029218 A1 | 1/2016 | Otiato et al. | |
| 2017/0041338 A1* | 2/2017 | Martini | G06F 21/566 |

\* cited by examiner

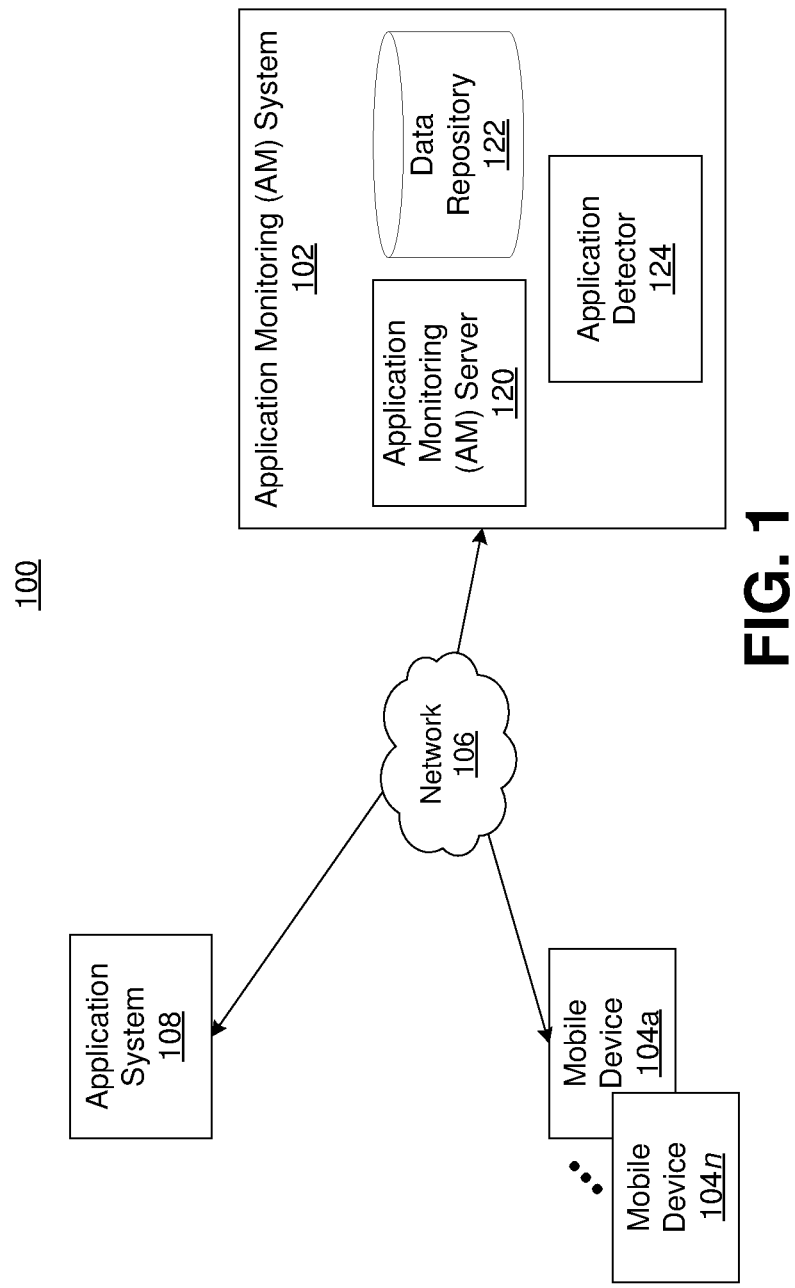

500

```
{
  "name": "Starbucks",
  "package_name": "com.starbucks.mystarbucks",
  "category": "shopping"
},
{
  "name": "MTV",
  "package_name": "com.mtvn.mtvPrimeiPad",
  "category": "entertainment"
}
```

```
"consumption":
[
        "seconds_consumed": "30",
        "start_epoch_utc": "1469471013",
        "uid":"3785"
        "meta_data":
        [
                {
                        "in": "1009",
                        "ua": "mtv\/3.304 CFNetwork\/758.4.3 Darwin\/15.5.0",
                        "out": "238",
                        "port": "80",
                        "host": "btg.mtvnservices.com",
                        "type": "HTTP"
                },
                {
                        "in": "14109",
                        "ua": "mtv\/3.0.2 (iPhone; iOS 9.3.2; Scale\/2.00)",
                        "out": "224",
                        "port": "80",
                        "host": "media.mtvnservices.com",
                        "type": "HTTP"
                },
                {
                        "in": "48240",
                        "ua": "mtv\/3.304 CFNetwork\/758.4.3 Darwin\/15.5.0",
                        "out": "751",
                        "port": "80",
                        "host": "relaunch.api.mtv.com",
                        "type": "HTTP"
                }
        ]
]
```

FIG. 6A

```
"consumption": [
  {
    "start_epoch_utc": "1495348115",
    "seconds_consumed": "30",
    "seq_id": "149534811512292",
    "uid": "0",
    "meta_data": [
      {
        "host": "youtubei.googleapis.com",
        "type": "HTTPS",
        "port": "443",
        "timestamp": "1495348123061",
        "out": "6535",
        "activity": "19",
        "in": "35090"
      },
      {
        "host": "i.ytimg.com",
        "type": "HTTPS",
        "port": "443",
        "timestamp": "1495348119803",
        "out": "1695",
        "activity": "56",
        "in": "149663"
      },
      {
        "type": "HTTP",
        "activity": "6",
        "port": "80",
        "timestamp": "1495348128163",
        "ua": "AppleCoreMedia\/1.0.0.14B100 (iPhone; U; CPU OS 10_1_1 like Mac OS X; en_us)",
        "out": "672",
        "host": "gsp1.apple.com",
        "in": "378"
      },
      {
        "host": "www.youtube.com",
        "type": "HTTPS",
        "port": "443",
        "timestamp": "1495348115122",
        "out": "11268",
        "activity": "44",
        "in": "19849"
      },
      {
        "host": "r2---sn-n4v7sne7.googlevideo.com",
        "type": "HTTPS",
        "port": "443",
        "timestamp": "1495348128282",
        "out": "172702",
        "activity": "8963",
        "in": "35972449"
      }
    ]
  }
]
```

<many more words preceed>

"fun" : "17232",
"3d" : "17461",
"vegas" : "17904",
"2015" : "18128",
"ipad" : "18265",
"my" : "18351",
"puzzle" : "19812",
"by" : "21192",
"edition" : "21240",
"de" : "22446",
"your" : "22858",
"guide" : "23293",
"games" : "24208",
"lite" : "25318",
"mobile" : "25337",
"kids" : "26839",
"in" : "30330",
"with" : "30597",
"casino" : "33309",
"to" : "33773",
"app" : "37265",
"slots" : "45790",
"hd" : "47907",
"of" : "52875",
"pro" : "54814",
"game" : "76007",
"and" : "91313",
"free" : "99403",
"the" : "112916",
"for" : "116423"
}
```

```
// Len  s1Len s2Len      sizeRatio     wordSizeAverageRatio
// (8)   4 4 vs 7         7 / 8 = .875    4 / 7 = .57           // take s2
// (10)  5 5 vs 7         7 / 10 = .7     5 / 7 = .714          // take s1
// (12)  6 6 vs 7         7 / 12 = .583   6 / 7 = .857          // take s1
// (16)  4 4 4 4 vs 7 7   14 / 16 = .875  4 / 7 = .57           // take s2
```

FIG. 9

# DERIVING MOBILE APPLICATION USAGE FROM NETWORK TRAFFIC

CROSS REFERENCE TO RELATED APPLICATIONS

This application claims a benefit of U.S. Provisional Patent Application Ser. No. 62/376,286, filed Aug. 17, 2016, the contents of which is incorporated by reference herein.

TECHNICAL FIELD

This disclosure generally relates to monitoring of application usage on mobile devices.

BACKGROUND

Mobile application usage information can be useful to monitor an individual's device engagement habits and monitor network activity autonomously generated by the device. Some mobile device operating systems prevent third party applications from gaining information about other applications and related information regarding how, what, when, or where a user uses the device. However, mobile operating systems may provide a Virtual Private Network (vpn) layer or other way that allows for monitoring of network traffic of the device that otherwise may be prevented from gaining access to such information.

BRIEF DESCRIPTION OF THE FIGURES

The disclosed embodiments have advantages and features which will be more readily apparent from the detailed description, the appended claims, and the accompanying figures (or drawings). A brief introduction of the figures is below.

FIG. 1 is schematic block diagram of a system environment for an application monitoring system, in accordance with one embodiment.

FIG. 5 shows an example of application strings, in accordance with one embodiment.

FIG. 6A shows an example of network consumption data, in accordance with one embodiment.

FIG. 6B shows an example of network consumption data, in accordance with one embodiment.

FIG. 8 shows an example of an application dictionary, in accordance with one embodiments FIG. 9 shows an algorithm to balance compound and single string matches, in accordance with one embodiment

DETAILED DESCRIPTION

Figure 2A:
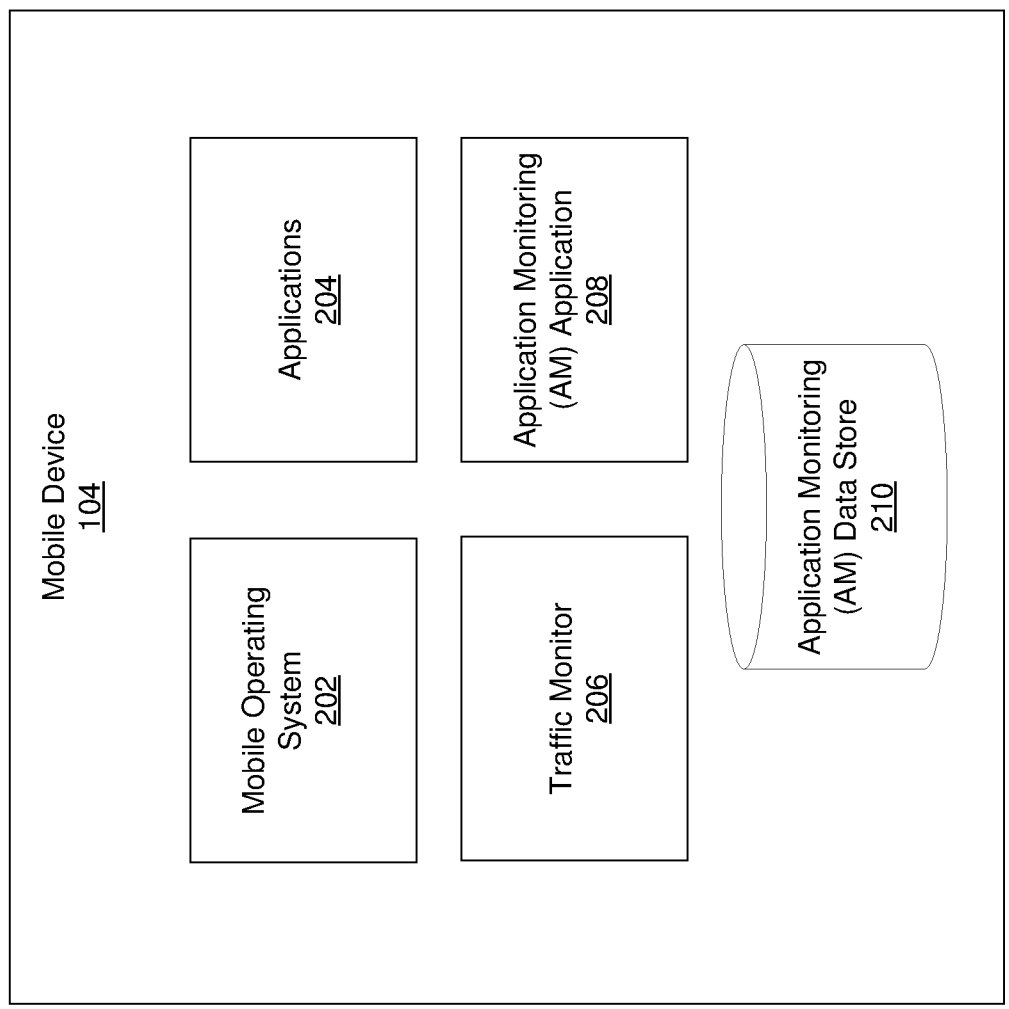
FIG. 2A is a schematic block diagram of a mobile device, in accordance to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Example embodiments relate to understanding the nature of network traffic generated by a device, such as a mobile device, to develop insight into a set of metrics such as the amount of data being generated by various applications and system activities. Usage data for applications executing on the device is determined from network consumption data that indicates the network traffic generated by the device.

Some embodiments include a configuration (e.g., a method and/or system) for monitor application usage. The configuration includes, for example, determining an application list of applications executing on a device. The configuration determines application strings associated with the applications and receives network consumption data for a process executing on the device. The configuration determines consumption data strings from the network consumption data and determines match scores between the applications and the consumption data strings by comparing the application strings and the consumption data strings. The configuration identifies an application from the application list for the process based on the match scores and associates the network consumption data for the process with the application. The configuration generates usage data for the application by aggregating network consumption data associated with the application over time.

Some embodiments include a non-transitory computer readable medium that store executable instructions. The instructions, when executed by a processor, configures the processor to: determine an application list of applications executing on a device; determine application strings associated with the applications; receive network consumption data for a process executing on the device; determine consumption data strings from the network consumption data; determine match scores between the applications and the consumption data strings by comparing the application strings and the consumption data strings; identify an application from the application list for the process based on the match scores; associate the network consumption data for the process with the application; and generate usage data for the application by aggregating network consumption data associated with the application over time.

Application Monitoring System

FIG. 1 is schematic block diagram of a system environment 100 for an application monitoring (AM) system 102, in accordance with one embodiment. The system environment 100 includes the AM system 102 that monitors application usage of a mobile device 104 via a network 106. The system environment 100 further includes one or more application systems 108 that provide applications for the mobile device 104. The network 106 can include various types of communication networks, including wired and/or wireless networks. In some embodiments, the network 106 includes the Internet.

The AM system 102 may include an application monitoring (AM) server 120, an application detector 124, and a data repository 122. The AM server 120 provides an interface with the mobile devices 104, provides storage for derived application usage data, intermediate information states, and application lists. The application detector 124 receives network consumption data for processes executing on the mobile device 104, and identifies applications for the processes by analyzing the network consumption data. The application detector 124 generates usage data for applications executing on the mobile device 104 by aggregating network consumption data associated with applications over time. The application detector 124 may further updates the usage data, such as by modifying usage time parameters (e.g., usage time, usage time line, etc.) based on analyzing properties of the network consumption data. The application detector 124 generates and provides reports of the usage data for applications to the mobile device 104, or another device (e.g., another mobile device 104). In some embodiments, the usage data is generated by processing network consumption data to more accurately reflect user engagement time with the applications. In some embodiments, the application detector 124 provides reports, usage data, or aggregated network consumption data to the AM server 120 which provides this information to a mobile device 104. The data repository 122 stores data associated with application monitoring including network consumption data received from the mobile device 104, and usage data generated from aggregating the network consumption data for applications over time. In some embodiments, the application detector 124 is integrated with the AM server 120.

The mobile device 104 is a device with computing functionality and data communication capability via the network 106. For example, the mobile device 104 executes applications that communicate with application systems 108 via the network 106, and communicates with the AM system 102 to report network consumption data via the network 106. The application systems 108 may include host servers that communicate with applications. The mobile device 104 may be a portable computing device such as a smartphone, tablet, wearable device, laptop computer, personal digital assistant (PDA), etc.

Although a single mobile device 104 is shown in FIG. 1, the environment may include any number of mobile devices 104a-n (n being nth device), i.e., one or more mobile devices (generally 104). In some example embodiments, the AM system 102 supports monitoring of a first mobile device 104a by a second mobile device 104b (not shown). The first mobile device 104a may belong to a parent and the second mobile device may belong to a child, for example, and the AM system 102 provides application usage of the second mobile device to the first mobile device to facilitate parental controls. Although the device 104 is discussed herein as being a mobile device, in some embodiments, the device 104 is another type of device such as a wired or stationary device. For example, the device 104 may be a desktop computer, workstation, computing terminal, or the like.

The application system 108 may provide an application to the mobile device 104 via the network 106. The mobile device 104 may execute various types of operations including games, video applications, social media applications, Internet browsers, email applications, service applications, etc. The application system 108 communicates data, information, instructions, or services with the client device 104 in connection with the execution of these applications. For example, the application system 108 receives an information request from the mobile device 104, processes the received information request, and transmits the requested information back to the mobile device 104 via the network 106. Although a single application system 108 is shown in FIG. 1, the system 100 may include any number of application systems 108 that communicate with applications executing on the mobile device 104. The AM system 102 monitors communications between the mobile device 104 and application systems 108 to generate usage data for applications executing on the mobile device 104.

FIG. 2A is a schematic block diagram of a mobile device 104, in accordance to one embodiment. The mobile device 104 includes a mobile operating system 202, one or more applications 204, a traffic monitor 206, an AM application 208, and an AM data store 210. The mobile operating system 202 executes the various software modules such as the one or more applications 204, the traffic monitor 206, and the AM application 208.

The mobile operating system 202 may provide a Virtual Private Network (vpn) layer that allows network traffic of the device 104 to be monitored by the traffic monitor 206. The traffic monitor 206 generates network consumption data for processes, which may be associated with Process IDs. For each instance of network consumption data, the operating system may provide the Process ID, or the traffic monitor 206 may generate a Process ID. The traffic monitor 206 provides the network consumption data to the AM application 208, or to the application detector 124.

The AM application 208 may provide a user interface for interacting with the application monitoring functionality. For example, the AM application 208 may provide a report of usage data or network consumption data of applications for display to the user. In some embodiments, the AM application 208 communicates with the AM server 120 to receive the reports. The reports may be pertaining to the device 104, or another device that is being monitored by the device 104. In some embodiments, the AM application 208 performs some or all of the functionality discussed herein with respect to the AM server 120 or the application detector 124. For example, the AM application 208 may analyze network consumption data received from the traffic monitor, associate network consumption data with applications, generate usage data for the applications, etc.

The AM data store 210 stores information associated with application monitoring, such as network consumption data, aggregated network consumption data, the application list, usage data associated with applications, reports of usage data for the applications, etc.

In some embodiments, the traffic monitor 206 and AM data store 210 are not on the mobile device 104, but are instead a VPN endpoint. The AM system 102 may use application lists for applications executing on the mobile device 104 with the network consumption captured at the VPN endpoint used by the mobile device 104 to monitor application usage on the mobile device 104.

Figure 2B:
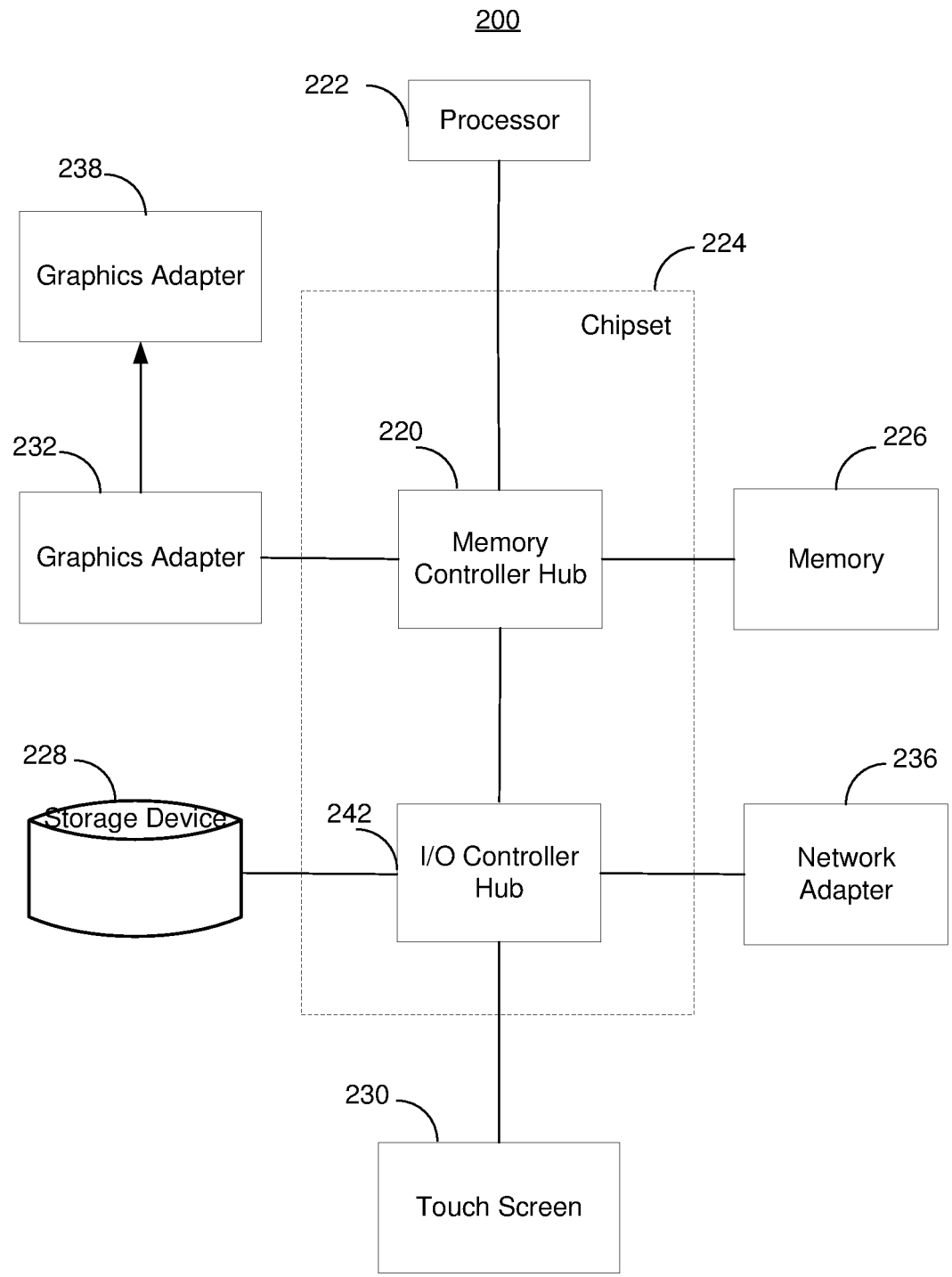
FIG. 2B is a high-level block diagram illustrating an example of a computer for use as one or more of the entities illustrated in FIG. 1, in accordance with one embodiment.

FIG. 2B is a high-level block diagram illustrating an example of a computer 200 for use as one or more of the entities illustrated in FIG. 1, according to one embodiment. Illustrated are at least one processor 222 coupled to a chipset 224. The chipset 224 includes a memory controller hub 240 and an input/output (I/O) controller hub 242. A memory 226 and a graphics adapter 232 are coupled to the memory controller hub 240, and a display device 238 is coupled to the graphics adapter 232. A storage device 228, touch screen 230, and network adapter 236 are coupled to the I/O controller hub 242. Other embodiments of the computer 200 have different architectures. For example, the memory 226 is directly coupled to the processor 232 in some embodiments. The computer may also include other types of input device coupled to the I/O controller hub 242 such as a keyboard, mouse, etc.

The storage device 228 includes one or more non-transitory computer-readable storage media such as a hard drive, compact disk read-only memory (CD-ROM), DVD, or a solid-state memory device. The memory 226 holds instructions and data used by the processor 222. The touch screen 230 to input data into the computer system 200. The graphics adapter 232 displays images and other information on the display device 238. In some embodiments, the display device 238 is integrated with the touch screen 230 for receiving user input and selections. The network adapter 236 couples the computer system 220 to the network 106. Some embodiments of the computer 200 have different and/or other components than those shown in FIG. 2B. For example, the AM server 120 can be formed of multiple blade servers and lack a display device, keyboard, and other components.

The computer 200 includes circuitry adapted to execute computer program modules for providing functionality described herein. The circuitry may include a processor and/or a storage (e.g., memory and/or non-transitory memory). As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 228, loaded into the memory 226, and executed by the processor 222.

Application Monitoring

Figure 3:
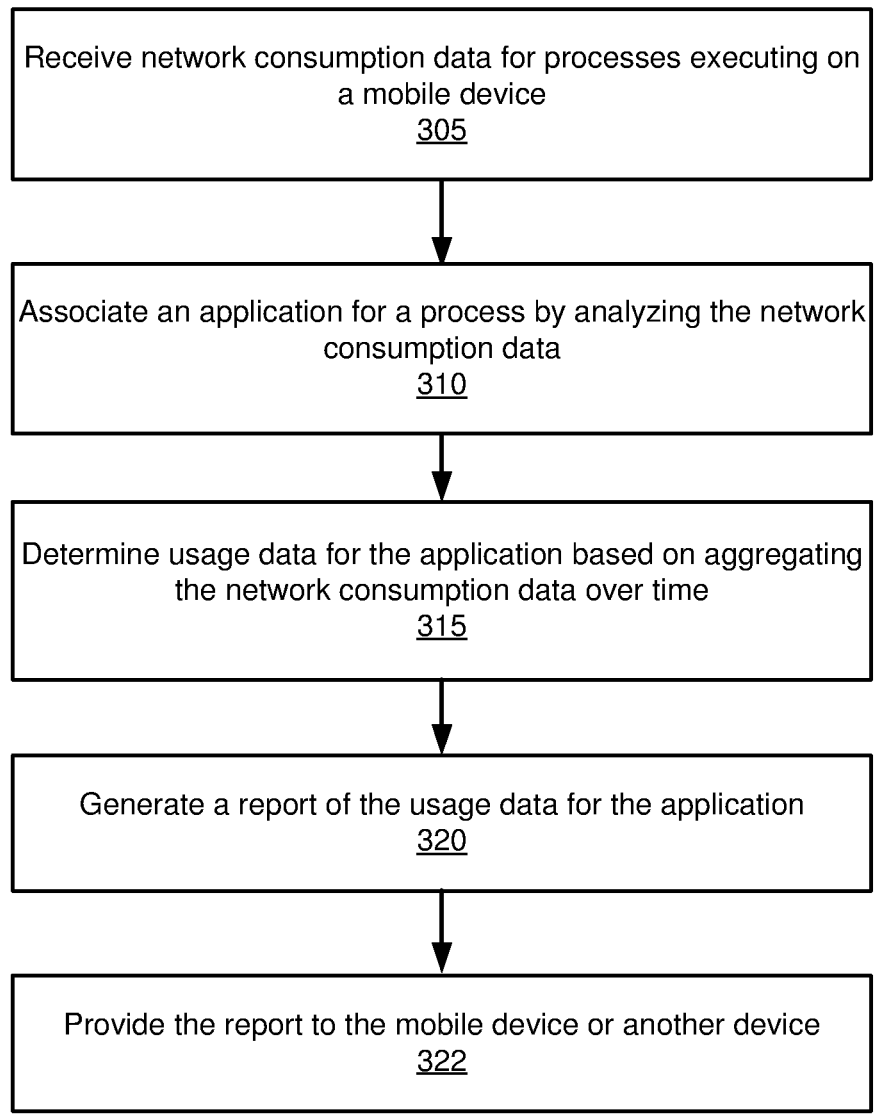
FIG. 3 is a flow chart of a process for generating a report of usage data for applications executing on a mobile device, in accordance with one embodiment.

FIG. 3 is a flow chart of a process 300 for generating a report of usage data for applications executing on a mobile device, in accordance with one embodiment. The process 300 is discussed as being performed by the components of the system 100, but may be performed by other computing device or circuitry. In particular, the application detector 124 performs the process 300 to provide a report regarding application usage of a mobile device 104 to the AM application 208 of the mobile device 104, or another device. In some embodiments, the AM application 208 of the mobile device 104 performs some or all of the steps of the process 300.

The application detector 124 receives 305 network consumption data for processes executing on a mobile device 104. Each application executing on the mobile device 104 can be associated with one or more processes, and multiple applications can be executing at the same time in the foreground or background. Each process may communicate with multiple network hosts, which is recorded in the network consumption data. The network consumption data for the process may include data for a single process or multiple processes.

In some embodiments, the application detector 124 monitors the mobile device 104 and receives the network consumption data on a scheduled basis. The network consumption data is associated with a process, which may be identified at the application detector 124 using a process identifier (ID). In other embodiments, the mobile device 104 or another device sends (or transmits) an HTTP or HTTPS request, or the like, to the AM server 120 to receive a report of an analysis regarding application usage on the mobile device 104. In response to the request, the application detector 124 requests and receives the network consumption data from the mobile device 104 via the network 106.

The application detector 124 associates 310 an application with a process by analyzing the network consumption data. For example, the AM application detector 124 associates an application from an application list of applications executing on the mobile device 104 with the process ID of the network consumption data. The application detector 124 determines 315 usage data for the application based on aggregating the network consumption data associated with the application over time. The application detector 124 performs an analysis of the network consumption data to identify the application associated with the network consumption data, and also the usage data indicating the user engagement time with the application. Additional details regarding the analysis are discussed below in the process 400 shown in FIG. 4.

The application detector 124 generates 320 a report of the usage data for the application. The report may include a listing of applications that execute on the mobile device 104, usage data for each application, among other things.

The application detector 124 provides 325 the report to the mobile device 104 or another device. For example, the application detector 124 returns the result of the analysis including the usage data for the applications executing on the mobile device 104 via the AM server 120.

Figure 4:
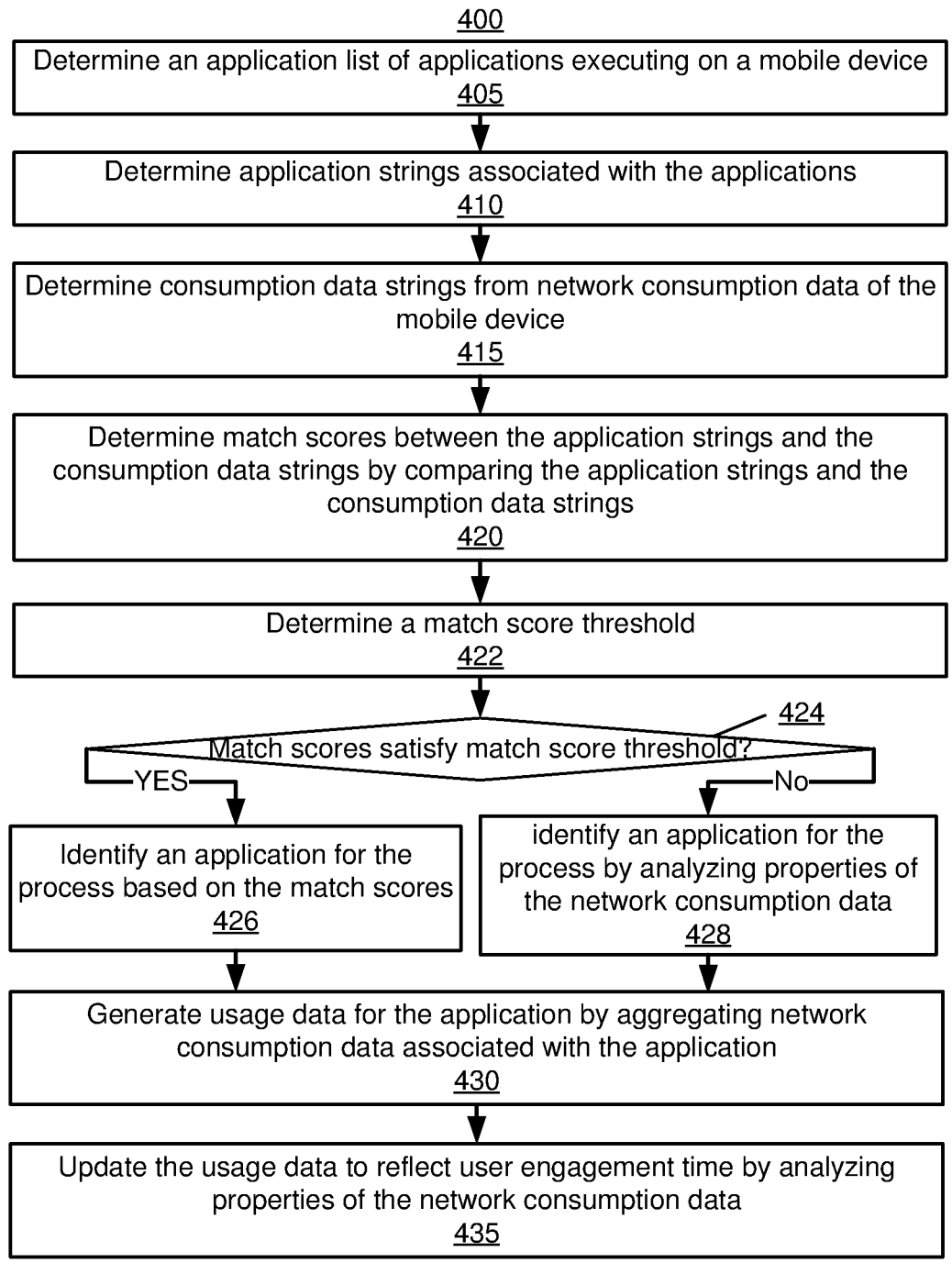
FIG. 4 is a flow chart of a process for generating usage data for an application based on network consumption data of a mobile device, in accordance with one embodiment.

FIG. 4 is a flow chart of a process 400 for generating usage data for an application based on network consumption data of a mobile device 104, in accordance with one embodiment. The process 400 may be performed at 310 and 315 of the process 300. The process 400 is discussed as being performed by the components of the system 100, but may be performed by other computing devices. In particular, the application detector 124 performs the process 400. In some embodiments, the AM application 208 of the mobile device 104 performs some or all of the steps of process 400. For example, processing may be split between the mobile device 104 and the application detector 124.

The application detector 124 determines 405 an application list of applications executing on the mobile device 104. For example, the mobile operating system 202 generates the application list based on applications that are executing on the mobile device 104, and provides the application list to the AM server 120. The application detector 124 uses the applications on the application list as candidate applications for matching with network consumption data of processes. In another example, the AM server 120 or application detector 124 generates the application list.

The application detector 124 determines 410 application strings associated with the applications. The application may be associated with application strings that can be used to identify particular applications. The application strings may include an application name string for each application, a package name string for the packages of each application, and a category string for each application. In some embodiments, the application strings may further include key word strings that application providers associate with the application, such as in the application's description in an application store.

FIG. 5 shows an example of application string 500, in accordance with one embodiment. Example application strings may include an application name string, package name string, and category string. The application strings may be found from publically available information, developer member services, or entered manually.

The application detector 124 determines 415 consumption data strings from network consumption data for a process of the mobile device 104. The consumption data strings may be parameters extracted from the network consumption data received from the mobile device 104. Among other things, the consumption data strings of an instance of network consumption data may include a host string and a user-agent string. The network consumption data may further include a uid parameter that the application detector 124 uses as a process ID for the process. In another example, the application detector 124 generates a process ID for the network consumption data when no uid parameter is provided in the network consumption data.

FIG. 6A shows an example of network consumption data 600, in accordance with one embodiment. This data may be displayed on a screen of a computing device. Applications executing on device 104 make network request, such as to application systems 108, in pulses over a period of time. The traffic monitor 206, which may be an on-device smart virtual private network (vpn) processor, observes parameters of these pulses to generate the network consumption data and provide the network consumption data to the application detector 124. For example, the traffic monitor 206 may detect 15-20 pulses or network requests/connections in a span of 30-60 seconds. The traffic monitor 206 groups these pulses into time-slots, each time slot being represented by an instance of the network consumption data 600.

In some embodiments, each instance of network consumption data is represented in a data structure to define (1) data of network connections/pulses captured by the traffic monitor 206 for the vpn layer of the mobile device 104 for a time-slot, and (2) if the operating system permits differentiation of processes or applications, it can have multiple instances of data of network connections/pulses as indicated by the "uid" parameter in the network consumption data 600.

With reference to the consumption data 600, the uid parameter defines an identifier that used to identify a process or a particular application. In some operating systems, the uid is a unique process identifier that is directly available from the operating system. In some operating systems it can be restricted, such as in the form of a hash. When no uid is provided via the network consumption data, a Virtual or Logical Process IDs can be used.

The seconds_consumed parameter defines an estimated parameter generated by the traffic monitor 206 indicating the seconds consumed by the process as identified by the uid. The start_epoch_utc parameter defines an initial time that the traffic monitor 206 detected the network pulse (e.g., in the case of multiple pulses/connections).

The metadata includes detailed information of multiple network/socket connections made by a particular process or application. At any point, there can be multiple such network requests coming from the same process to the same or different hosts. Meta_data is a group of such network pulses grouped by host-post-user agent combination and aggregating in/out bytes, duration, activity, timestamp during a period of 1 to n seconds.

The network consumption data 600 may define multiple pulses. Each pulse may include in and out parameters defining bytes received and transmitted in the pulse. The in and out parameters may be used to weight the importance of traffic, or to detect a high bitrate connection that would be indicative of video, music, or other type of transfer. The ua parameter defines the user-agent string and the host parameter defines the host string, which may be used as the consumption data strings determined from the network consumption data 600. The host string may be a domain name service (DNS) or an Internet protocol (IP) address. The port parameter defines the port used for communicating the network consumption, and in some embodiments, may be used to match to applications or application types.

FIG. 6B shows an example of network consumption data 650, in accordance with one embodiment. The network consumption data 650 includes an activity parameter defining the number of pulses or connections that happened during a time-slot in the network consumption data 650. The network consumption data 650 also does not include a uid, as shown by the "0" value. As discussed above, when no uid is provided via the network consumption data, a Virtual or Logical Process IDs can be used.

The application detector 124 determines 420 match scores between the application strings and the consumption data strings by comparing the application strings and the consumption data strings. For example, the application detector 124 identifies matching strings between the application strings and the consumption data strings along weighted search paths defined between the application strings and the consumption data strings. In some embodiments, the application detector 124 determines match scores by generating a search matrix between application strings and consumption strings, determining weight values of matches along the search paths, identifying matches in the search matrix between an application string and a consumption data string, and determining match scores for the matches based on the weight values of the matches.

Figure 7:
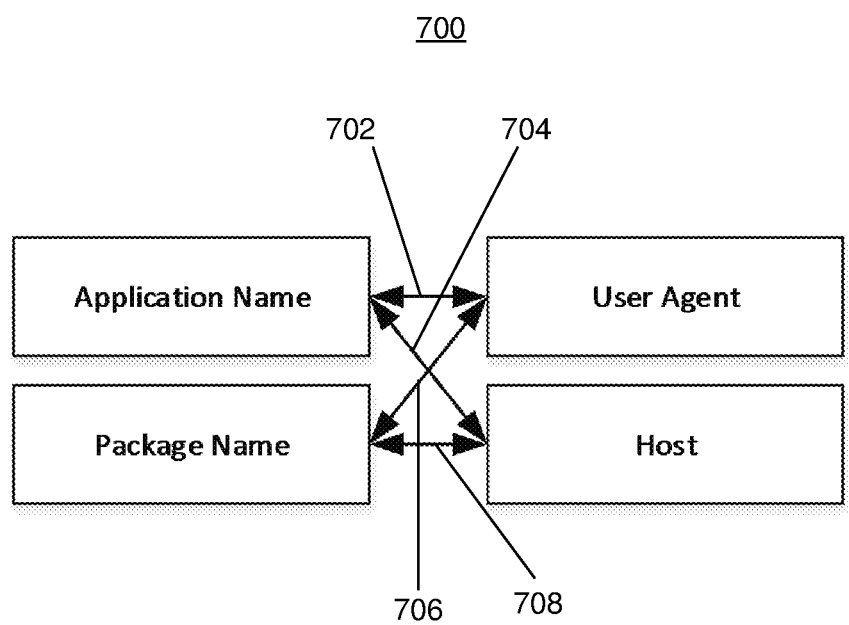
FIG. 7 shows an example of a search matrix, in accordance with one embodiment.

FIG. 7 shows an example of a search matrix 700, in accordance with one embodiment. The search matrix 700 shows search paths between the application strings and the consumption data strings. For example, the search matrix 700 shows (bi-directional) search paths 702 between the application name string and the user-agent string, search paths 704 between the application name string and the host string, search paths 706 between the package name string and the user-agent string, and search paths 708 between the package name string and the host string. Each search path may be a weighted search path, where a match between the application string and consumption data string along the search path is assigned a weighting value. Different search paths may be associated with different weighting values which are used to determine the match score when a match is identified along a search path. In some embodiments, each search path direction uses different types of rules in order to be identified as a match. For example, a host string to package name string match may require a simple longest common substring match, whereas a user-agent string to application name string match may require a simple string match that finds the product name portion of the user-agent string inside the application name string.

In some embodiments, for comparing the application name string to the host string, substrings of the host string would be searched within the full application name string. Host names are typically abbreviations or subsets of application names. For this reason substrings within a host string are searched within the application name string. In the case of a User-Agent string to the application name string search, both directions are done. Words in the user-agent string are searched in the application name string, then the words in the application name string are searched within the user-agent string. The user-agent strings are searched in the package name string, and not vice-versa. Host string and package name string may use a longest common substring type of algorithm.

Once the string match as defined by the search matrix has been performed, the matches are ordered by match score. The match score may be determined by applying a weighting value to the match. For example, finding the user-agent string within the application name string could be the highest order weighting. In another example, finding a substring between the host string and the package name string could be the lowest weight in the ordering, finding a match between the user-agent string and the package name string the second highest weight, and finding a substring between the host string and the application name string the third highest weight. If two matches have the same weight, then the number of times a match is found is compared, the highest count receives the highest weight. The weighting of the matches along search paths in the search matrix may be different for different search paths, may vary based on the word count of the matching string, etc. Search path matches that are more indicative for application identification may be weighted higher than search paths matches that are less indicative for identification matching. Furthermore, other properties of the network consumption data may be used to determine the weighting of the match, such as the bytes in or bytes out, the word that is matched in the search path, etc.

In some embodiments, the application detector 124 uses a whitelist and/or a blacklist of strings to find matches between the application strings and consumption data strings along the search paths. The whitelist may be in the form of a dictionary of words. In some embodiments, the dictionary is generated from the list of all words found in all the applications in the device manufacturer's application store. The names of all published applications in the application store may be used to generate the strings and associated word counts. In some embodiments, the dictionary is generated in using other techniques.

FIG. 8 shows an example of an application dictionary 800, in accordance with one embodiments. The application dictionary includes a listing of words and corresponding word counts. The dictionary format may be ["word": "word count" ] format. The more words in the application dictionary 800, the more likely highly desirable matches can found.

The blacklist is a collection of strings that are not to be used for matching. However, the blacklisted words can be used in comparisons if compared in conjunction with other non-blacklisted words. As shown in the application dictionary 800, the top words by word count may be blacklist words. The words "game" and "kids" are not useful words to compare in isolation. However, requiring two or more blacklisted words to satisfy a valid string match is very useful. An application name of "Pro Game Slots for Kids" would be a match with the HOST name "progameslotskids.com" but not a match with a host that contained only one of the words such as "mtvkids.com." The words "for", "the", and "free" would likely be words that are always blacklisted since they are too common to provide distinction.

When using the dictionary to find words, the application detector 124 may apply a balance between finding compound words, and single words when determining match scores. For example, the application detector 124 may use as much of the string as possible while balancing the use of compound words to find a better string match. The dictionary example of words in FIG. 8 shows the word count to the right of each word (e.g., "for": "116423"). In some embodiments, the word counts can be used as a weighting value in determining match scores.

In some embodiments, the lowest word count strings get a higher rank when used in calculations due to the uniqueness of the word. For example, a contrived word or a large compound word is more unique than a common word like casino or slots. For example, "BigHouseCasinoSlots" as one word in an application name would be more unique than the four substrings which are common and these smaller words would have a higher word count individually. For example, given two application names "Big House Casino Slots" and "BigHouseCasinoSlots", and a host "bighousecasinoslots", the BigHouseCasinoSlots application should match the host over the "Big House Casino Slots" because of the higher rank (lower word count in the dictionary).

In some embodiments, the application detector 124 applies an algorithm to balance compound and single words. FIG. 9 shows an algorithm 900 to balance compound and single string matches, in accordance with one embodiment. The full length of a word is consumed by "s1" while "s2" is just short of the full string size. Comparing the ratio of the size (sizeRatio) to the word size average (wordSizeAverageRatio) allows for a good balance between the competing desirables. In FIG. 9, the string "s1" and "s2" are compared. Each string has a number of substrings and the strings are sorted such that s1 is larger than s2. These substrings were found in the dictionary. Two ratios are compared between the two strings, the sum total size of the word (s2/s1) and the average word size of all the substrings (s1/s2). The lower ratio is used as the higher ranking.

The algorithm balances the uniqueness of substrings with the ratio resulting from the total substring character count divided by the total string size. Longer unique substring words that use most of the string are favored over smaller substrings that use all of the string, but using too little of the string is not desired if a set of shorter sized substrings can use all of the string.

In some embodiments, host strings associated with HOSTs that are common or HOSTs that are related to the device manufacturer may not provide a match distinction. These hosts are filtered out of the string match algorithm, for example they may be blacklisted or otherwise treated differently from other types of host strings.

In some embodiments, the application detector 124 accounts for abbreviations, acronyms, or other types of variations when matching application strings and consumption data strings. Other string sources may utilize a more basic type of string matching such as preparation for longest common substring match. This may be used in cases where abbreviations or acronyms are used. A mix of acronyms and dictionary words in a single string source should be found as well. More generally, a mix of dictionary words and non-dictionary words should be found.

In some embodiments, the application detector 124 generates the match score by collecting parameters of the network consumption data, and sorting the parameters for the purpose of generating weighing values. Sort parameters may include timestamp, number of bytes transmitted, presence of a user-agent, blacklist or similar categorization. The weighting of each parameter may be modified as suitable. For example, the presence of a user-agent string may come before timestamp if the user-agent provides a better indicator for items that preceded it. If a known advertiser consumption item that has timestamp of 1 second before a consumption item with a user-agent, the first item may be grouped with the second item (e.g., an user-agent denoted item) such that the user-agent item will be used to find a matching application. These two items will count toward the same Process ID because of time proximity. Time proximity may be a configurable parameter in the range of 0 seconds to several minutes.

In some embodiments, the application detector 124 creates a Virtual Process ID, if none exists, for the network consumption data or otherwise associates the network consumption data with a process ID. The application may be matched to the process ID. In some embodiments, the weighting of a search path is used as an order for comparing search paths in the search matrix. For example, the user-agent string is used first to find a matching application string. If a matching application string is found and no Virtual Process ID exists for that user-agent string, a Virtual Process ID is created and the two items are added to that Process ID. This results in the application being associated with the network consumption data. The user-agent and the hosts from the two network consumption data items are assigned to the Virtual Process ID. The Virtual Process ID then has a timeout ranging from minutes to hours. Each new matching consumption data item that matches the parameters of this Virtual Process ID (Hosts and User Agent in this case) the timer of the timeout will be reset and add to the usage data for a Virtual Process ID.

Special cases may be needed such known blacklisted items, mail, or User Agents of the operating system. These cases can be grouped into special Virtual Process IDs that have no known installed application.

In some embodiments, a secondary process of Virtual Process ID assignment is examination of the byte count, and by extension byte rate. A high byte count could give priority over a lower byte count when determining which network consumption data item to use for application identification or match scores. For example, if two network consumption data items are one second apart in time, the higher byte count would be given priority when assigning to an application. Additionally, should the byte count be high enough, it may be determined that consumption data is video or audio. The video usage or audio usage can be called out as special cases. These cases could include calling out video usage as an individual usage irrespective of any particular application or assigning a specific host or user-agent to a specific application or a specific Virtual Process ID irrespective of any other criteria. For example, a host from a Ubiquitous Internet Overlord in the context of an Internet Browser User Agent would be assigned as traffic from an Internet Browser. If this same Host has a very high byte count, it could be considered video data from the application associated with the Ubiquitous Internet Overlord.

The application detector 124 determines 422 a match score threshold. The match score threshold defines a threshold level for match scores in which a match is determined to be reliable. The application detector 124 determines 424 whether the match scores satisfies the match score threshold. For example, each of the match scores for matches along search paths may be compared with the match score threshold to determine whether at least one match score exceeds the match score threshold.

In response to determining that one or more match scores satisfy the match score threshold, the application detector 124 identifies 426 an application for the process based on the match scores. The string matches result in associations of package names to all the network traffic on a specific process ID. The package name to process ID association is ordered according to match score. The association with the highest match score may be determined as the application using the specific Process ID. In some embodiments, the match scores are ordered or ranked without using a match score threshold. The application is associated with the network consumption data.

Returning to 424, in response to determining that none of the match scores satisfy the match score threshold, the application detector 124 analyzes 428 properties of the network consumption data to identify an application for the process. For example, filtering or grouping of HOSTs and User-Agents can identify Internet Browser usage or Operating System usage. If no match is found, or a match has a very low weighting, then other aspects of the network traffic can be used to find several types of applications. These types of applications include, but are not limited to, the following:

Internet Browser: This traffic is very heterogeneous. A high proportion of user-agents may correspond to an Internet Browser product. While some applications use the same type of user-agent, they will also show a non-browser related user-agents. The amount of requests tends to be very high relative to a time period with only one host related to the URL the device user selected (e.g., the link the user clicked or entered.) While a string match may have shown a valid package name, the statistics of the network traffic may need to override the package name found via string matching. This can happen when the search finds a word that should have been blacklisted but was not for various reasons. An Internet Browser has very heterogeneous network traffic profile and may be identified as an unknown application or as another application on the device that was not used, resulting in a false positive.

Unknown Applications with Heavy Advertising: If no package name was found, but a large number of pre-identified advertiser hosts (e.g., blacklisted HOSTs can be sub-classified, such as advertiser) then the Process ID can be classified depending on the interpretation of this category. For example, a game application that resides on the device's application list has not been identified in the past (by this device or other devices) as having any associated network. The category field in the application list can help narrow the possibilities. A game application is a good example because, unlike a social network application, a game application does not require a network to function as designed. However, we might see empirically that a game generates network traffic when retrieving advertiser content.

System Services: The operating system of the device may call several HOSTs managed by or in service of the manufacturer of the device or operating system while the device is in use or when the device is idle. The device may use specific user-agents when making HTTP requests.

Mail: Calls to HOSTs that manage email can be identified.

In some embodiments, the application detector 124 derives browser usage, unknown applications with advertisements, and filters system level network traffic using the network consumption data. The application detector 124 may further associate the network consumption data with an application identified from the analysis, such as a browser application, game application, or system service.

Additionally, filtering or grouping of HOSTs and User-Agents can identify Internet Browser usage or Operating System usage. The Internet Browser has very heterogeneous network traffic profile and may be identified as an unknown application or as another application on the device that was not used; a false positive.

Ubiquitous Internet Overlords

Some HOSTs and User-Agents appear in several applications and may be identified incorrectly. Filtering may be used to enhance the algorithmically generated data. The amount of entities generating this type of network traffic is small in practice, therefore manageable to identify specifically by name. Internet entities that create device applications but do not manufacturer any part of any device can have network traffic on almost all Process IDs though all to none of the Internet Entity's applications are being used. Facebook, for example, shows internet traffic for links, login management for an app, sharing features, and anything else they may use to promote their products. There are three types of cases for this case:

The application of the Internet entity is being used. This may be one of several apps and the network traffic may be only subtly different.

The main products of the Internet entity are being used in the context of an Internet Browser.

The features of the Internet entity show in the network traffic though no usage can be attributed to the Internet entity's application. This includes login management, sharing services, chat services, etc.

To understand the behavior for these cases, an empirical collection of network traffic "signatures" can be used. Periodically, network traffic should be collected for the target use case. The target use case then yields a network traffic signature that is used to determine the type of application usage occurring. As such, the application detector 124 may associate the network consumption data for the process with an application while accounting for the presence of Internet entities in the network consumption data. Without accounting for such entities, some HOSTs and User-Agents may appear in other applications and may be identified incorrectly. The application detector 124 may generate a network traffic signature for an Internet entity from historical network consumption data associated with the Internet entity, the network consumption data of the process with the network traffic signature to match the network consumption data with the network traffic signature, and assign the network consumption data matched with the network traffic signature to the application. As such, the network consumption data that would otherwise be assigned to the Internet entity is assigned to the application.

In order for network traffic relating to an Internet Entity to be assigned to the Internet Entity Application, the possibility of other applications must be ruled out or a special case must be present, such as a high bitrate associated with a specific host. Conversely, a known host that is associated with login or analytics (or other type of non-specific application usage relating to the user) would be blacklisted. Another example, if two or more Internet Entities are present in an application usage, then neither Internet Entity would be likely candidates.

The application detector 124 generates 430 usage data for the application by aggregating network consumption data associated with the application. For example, the application detector 124 uses steps 405-424 of the process 400 to associate additional instances of network consumption data with the application. Multiple applications may be monitored simultaneously, with the application detector 124 associating each instance of network consumption data captured by the traffic monitor 206 with a particular application. The instances of network consumption data for an application can be aggregated over time to generate the usage data. For example, the network consumption data may define a usage time parameter (e.g., "seconds_consumed") which is aggregated to determine the usage time over multiple time-slots.

In some embodiments, the application detector generates an internal representation of a stored analysis such that the analysis can be restored to its previous state quickly. This feature allows for an individual analysis server/entity to be stateless across analysis requests, and provides server scalability. The internal representation includes collecting all the network consumption data and all the usage data such that two or more consumption data inputs can be analyzed with respect to each other. It is also used to restore the state of the analysis such that an application process (an executable) can be restored to the previous state. Internal data can include currently valid Process IDs, currently valid process_bucket_ids, and prioritized consumption data. In some embodiments, the stored metadata may indicate the usage data or network consumption data is old and needs to be purged, allowing for a new start to the analysis. This is an issue when Process IDs used to identify processes are reused by the operating system.

The application detector 124 updates 435 the usage data to reflect user engagement time by analyzing properties of the network consumption data. For example, the application detector 124 may apply a set of rules to modify usage time or a usage time line for an application or process ID. A usage time defines a total time of usage within a time period or times of user within a time period, and a usage timelines defines changes in usage time over the time period. While user engagement is correlated with the creation of network consumption data, the relationship between user engagement time and network data transfer may vary based on application. The application detector 124 may update usage data to account for such variations in applications.

In some embodiments, the application detector 124 associates the usage data of one application with usage data of another application. For example, applications can be ordered according to weight; therefore Process IDs can be weighted. Once the Process IDs have weights, network traffic from a lower weighted Process ID can be given to a Process ID with a higher weight. For example, a Process ID associated with the operating system may have a high byte count, but be in close time proximity to another Process ID from an installed application that was assigned based on user-agent. The Operating System Process ID can be assigned to the Installed Application Process ID.

Additionally, apps that have a consistent network traffic "pulse" may have their usage times or usage timelines adjusted to reflect the true usage of the application from the perspective of user engagement. For example, a game does need network traffic to function, unlike a chat application. However, a game can regularly call advertisers. If this period is X to N minutes on average, then we can assume the user used the game for the full X to N minutes between network traffic pulses/bursts. Other Process IDs such as those related to system services can have time taken away if needed if they do not reflect actual user engagement with a specific application. In some embodiments, the bytes in and out of the network consumption data may also be used to weight the importance of one Process ID.

In some embodiments, the device 104 determines the usage time for network consumption data and sends the usage time in connection with the network consumption data. The device 104 may further assign the usage time to the process ID. However, it may be impractical to hold history and perform detailed analysis on the device 104, therefore the application detector 124 may perform the updates to the usage data.

Figure 10:
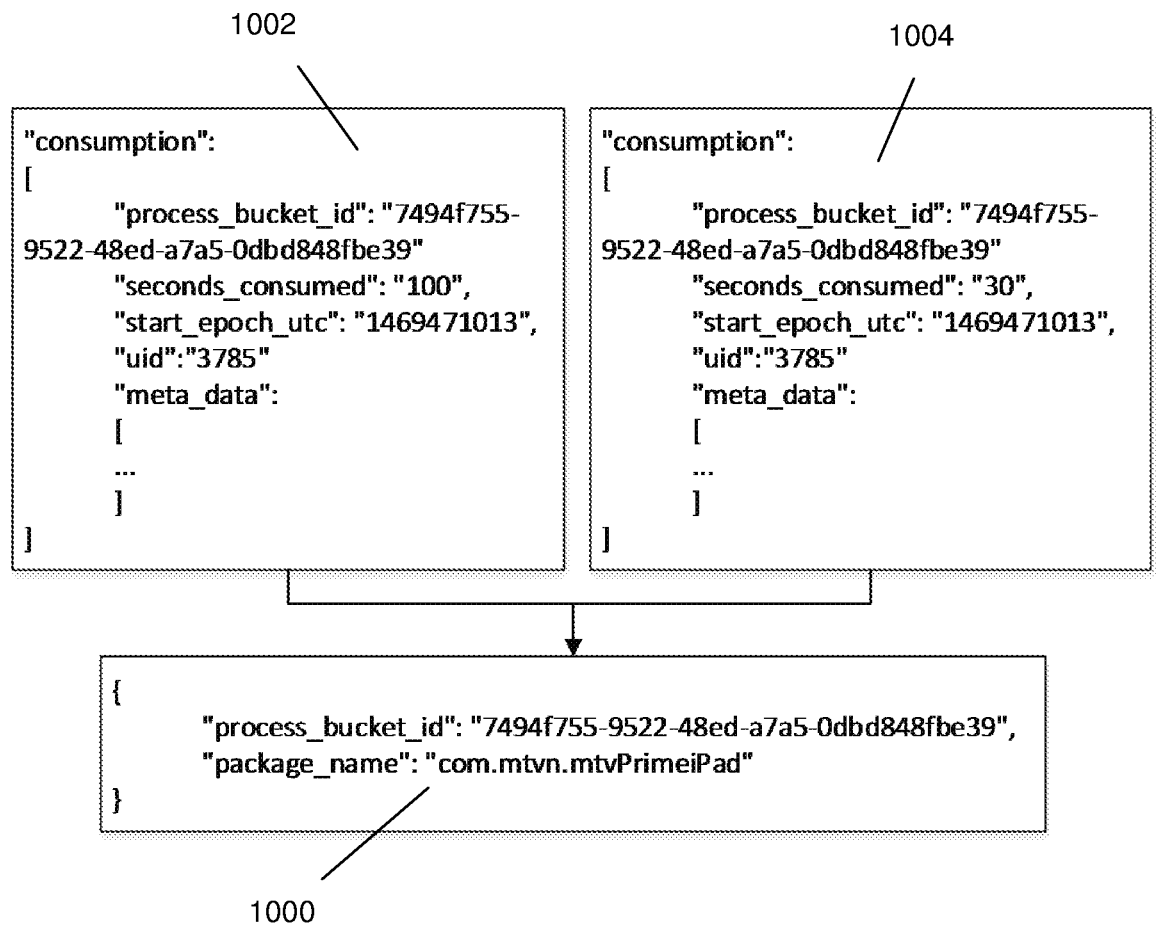
FIG. 10 shows an example usage data, in accordance with one embodiment.

FIG. 10 shows an example usage data 1000, in accordance with one embodiment. The usage data 1000 is generated by aggregating multiple instances of network consumption data, such as the network consumption data 1002 and 1004. The usage data 1000 includes a process_bucket_id parameter and a package_name parameter. The network consumption data 1002 and 1004 are assigned a process ID as defined by the process_bucket_id_parameter. The package_name parameter defines the application package associated with the process, and thus also the application associated with the process. In some embodiments, usage data includes the application name in addition or alternative to the process name.

Additional Considerations

The disclosed configurations may include benefits and advantages such as accurately identifying application usage and usage times based on network consumption data. Various mobile applications can make wide and changing variety of host requests, such as communications to advertisers, third party content management, etc. These types of communications complicate the identification of applications and usage monitoring based on network consumption data.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2A, and 2B. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for deriving mobile application usage from network traffic through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, performed by an Application Monitoring (AM) System that is connected via a network to one or more devices, comprising:
    determining an application list of different types of applications executing on a device of the one or more devices;
    determining application strings associated with the applications, wherein the application strings include an application name string, a package name string, and a category string;
    receiving network consumption data for a process executing on the device of the one or more devices;
    determining consumption data strings from the network consumption data, wherein the consumption data strings include a host string and a user-agent string;
    determining match scores between the application strings and the consumption data strings by:
        generating a search matrix between the application strings and the consumption data strings, the search matrix comprising bi-directional search paths between the application strings and the consumption data strings and each of the bi-directional search paths having a weighting value;
        identifying, based on different types of rules, matches between the application strings and the consumption data strings along the weighted search paths of the search matrix; and
        applying a weighting value to each of the matches based on the weighting value associated with the weighted search path along which the match was identified;
    identifying an application from the application list for the process in response to determining the match scores satisfy a match score threshold;
    associating the network consumption data for the process with the identified application;
    generating usage data for the identified application by aggregating network consumption data associated with the identified application over time;
    receiving second network consumption data for a second process executing on the device of the one or more devices;
    determining second consumption data strings from the second network consumption data;
    determining second match scores between the application strings and the second network consumption data strings;
    determining whether the second match scores satisfy the match score threshold;
    associating, in response to determining that the second match scores fail to satisfy the match score threshold, the second network consumption data for the second process with one of an internet browser application, an application including advertising, a system service, or an email application; and
    generating a report indicating a list of applications executing on the device of the one or more devices and the usage data or the network consumption data associated with the different types of applications.

2. The method of claim 1, wherein identifying an application from the application list for the process includes:
    generating a network traffic signature for an Internet entity from historical network consumption data associated with the Internet entity;
    comparing the network consumption data of the process with the network traffic signature to match the network consumption data with the network traffic signature; and
    assigning the network consumption data matched with the network traffic signature to the application.

3. The method of claim 1, wherein the network consumption data for the process includes a usage time parameter and wherein:
    associating the network consumption data for the process with the identified application includes associating a value of the usage time parameter with the identified application; and
    generating the usage data includes aggregating values of the usage time parameter.

4. The method of claim 1, further comprising, subsequent to associating the network consumption data for the process with the identified application, updating a usage time parameter of the network consumption data by incorporating a second usage time from the second network consumption data associated with the second process based on a ranking of the process and the second process.

5. The method of claim 1, further comprising updating the usage data of the identified application based on:
    determining an application type of the identified application; or
    determining a network consumption data pattern identified from the usage data of the identified application.

6. The method of claim 1, wherein the matching strings are defined by a white list and a black list of strings associated with the weighting value of each of the matches.

7. A non-transitory computer readable medium storing instructions that when executed by a processor, configures the processor to:
    determine an application list of different types of applications executing on a device;
    determine application strings associated with the applications, wherein the application strings include an application name string, a package name string, and a category string;
    receive network consumption data for a process executing on the device;

determine consumption data strings from the network consumption data, wherein the consumption data strings include a host string and a user-agent string;
determine match scores between the application strings and the consumption data strings by:
generating a search matrix between the application strings and the consumption data strings, the search matrix comprising bi-directional search paths between the application strings and the consumption data strings and each of the bi-directional search paths having a weighting value;
identifying, based on different types of rules, matches between the application strings and the consumption data strings along the weighted search paths of the search matrix; and
applying a weighting value to each of the matches based on the weighting value associated with the weighted search path along which the match was identified;
identify an application from the application list for the process in response to determining the match scores satisfy a match score threshold;
associate the network consumption data for the process with the identified application;
generate usage data for the identified application by aggregating network consumption data associated with the identified application over time;
receive second network consumption data for a second process executing on the device;
determine second consumption data strings from the second network consumption data;
determine second match scores between the application strings and the second network consumption data strings;
determine whether the second match scores satisfy the match score threshold;
associate, in response to determining that the second match scores fail to satisfy the match score threshold, the second network consumption data for the second process with one of an Internet browser application, an application including advertising, a system service, or an email application; and
generate a report indicating a list of applications executing on the device and the usage data or the network consumption data associated with the different types of applications.

8. The non-transitory computer readable medium of claim 7, wherein the instructions that configure the processor to identify an application from the application list for the process include the instructions configuring the processor to:
generate a network traffic signature for an Internet entity from historical network consumption data associated with the Internet entity; and
compare the network consumption data of the process with the network traffic signature to match the network consumption data with the network traffic signature; and
assign the network consumption data matched with the network traffic signature to the identified application.

9. The non-transitory computer readable medium of claim 7, wherein the network consumption data for the process includes a usage time parameter and wherein:
associating the network consumption data for the process with the identified application includes the processor being configured to associate a value of the usage time parameter with the identified application; and
generating the usage data includes the processor being configured to aggregate values of the usage time parameter.

10. The non-transitory computer readable medium of claim 7, wherein the instructions further configure the processor to, subsequent to associating the network consumption data for the process with the identified application, update a usage time parameter of the network consumption data by incorporating a second usage time from the second network consumption data associated with the second process based on a ranking of the process and the second process.

11. The non-transitory computer readable medium of claim 7, wherein the instructions further configure the processor to update the usage data of the identified application based on:
determining an application type of the identified application; or
determining a network consumption data pattern identified from the usage data of the identified application.

12. The non-transitory computer readable medium of claim 7, wherein the matching strings are defined by a white list and a black list of strings associated with the weighting value of each of the matches.

13. A system, comprising: circuitry comprising a processor and a non-transitory memory, the circuitry is configured to;
determine an application list of different types of applications executing on a device;
determine application strings associated with the applications, wherein the application strings include an application name string, a package name string, and a category string;
receive network consumption data for a process executing on the device;
determine consumption data strings from the network consumption data, wherein the consumption data strings include a host string and a user-agent string;
determine match scores between the application strings and the consumption data strings by:
generating a search matrix between the application strings and the consumption data strings, the search matrix comprising bi-directional search paths between the application strings and the consumption data strings and each of the bi-directional search paths having a weighting value;
identifying, based on different types of rules, matches between the application strings and the consumption data strings along the weighted search paths of the search matrix; and
applying a weighting value to each of the matches based on the weighting value associated with the weighted search path along which the match was identified;
identify an application from the application list for the process in response to determining the match scores satisfy a match score threshold;
associate the network consumption data for the process with the identified application;
generate usage data for the identified application by aggregating network consumption data associated with the identified application over time;
receive second network consumption data for a second process executing on the device;
determine second consumption data strings from the second network consumption data;

determine second match scores between the application strings and the second network consumption data strings;
determine whether the second match scores satisfy the match score threshold;
associate, in response to determining that the second match scores fail to satisfy the match score threshold, the second network consumption data for the second process with one of an internet browser application, an application including advertising, a system service, or an email application; and
generate a report indicating a list of applications executing on the device and the usage data or the network consumption data associated with the different types of applications.

\* \* \* \* \*